Dec. 18, 1962     H. E. RITTENHOUSE     3,068,844
LIQUID METER
Filed Jan. 21, 1960
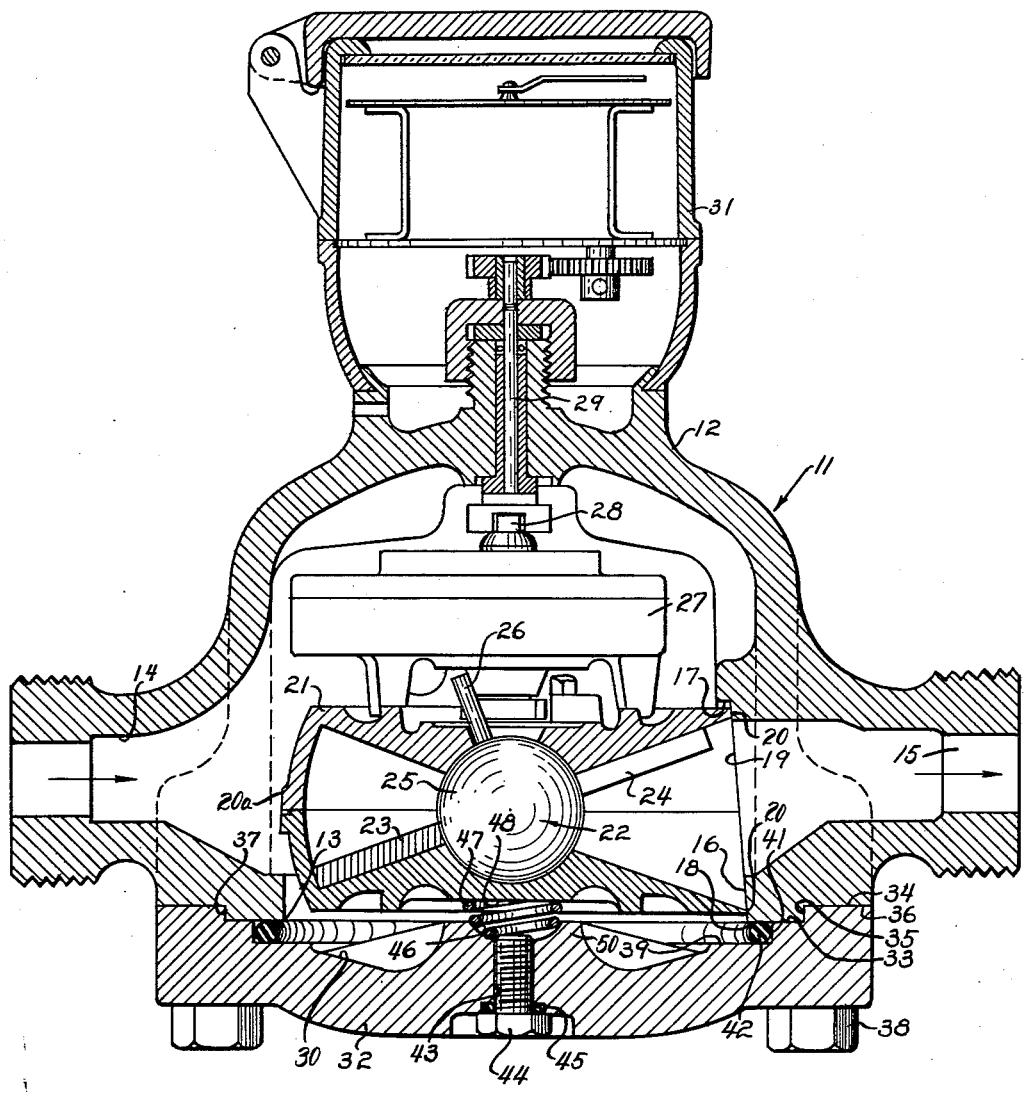
INVENTOR
HOWARD E. RITTENHOUSE
BY Strauch, Nolan & Neale
ATTORNEYS United States Patent Office 3,068,844
Patented Dec. 18, 1962

3,068,844
LIQUID METER
Howard E. Rittenhouse, Statesboro, Ga., assignor to Rockwell Manufacturing Company, Pittsburgh, Pa., a corporation of Pennsylvania
Filed Jan. 21, 1960, Ser. No. 3,870
4 Claims. (Cl. 121—69)

This invention relates to liquid meters and particularly to special internal construction for such meters that insures and preserves accuracy in high pressure lines.

The major object of this invention is to provide a novel meter construction wherein special coaction between the cover and body prevents undesired deformation of the body wall surrounding the measuring chamber.

A further object of the invention is to provide a novel liquid meter having a body provided with an open bottom through which a measuring chamber is inserted into snug fit with a surrounding body surface and coacting peripheral means on the body and a cover over the bottom for preventing deformation of that surface due to internal liquid pressure.

Pursuant to the immediately foregoing object this means may take the form of a continuous cylindrical surface on the cover closely surrounding a similar surface on the body at said open bottom.

Another object of the invention is to provide a novel liquid meter wherein a meter body is open at the bottom for insertion of a measuring chamber into snug peripheral fit with an internal body surface, and a spring is compressed between the cover and the measuring chamber.

Further objects of the invention will appear as the description proceeds in connection with the appended claims and the annexed drawing which is a section through a liquid meter constructed according to a preferred embodiment of the invention.

In its preferred embodiment the invention is incorporated in a water meter having a metal body housing 11 that is interiorly hollow with a closed top dome 12, an open bottom at 13 and inlet and outlet passages 14 and 15 for connection into a water pipeline.

Within the meter body is formed a measuring chamber receiving portion having a substantially cylindrical but slightly upwardly tapering side wall surface of revolution 16 that is intersected at its upper end by a flat body shoulder 17 perpendicular to the axis of surface 16. At its lower end surface 16 intersects a flat annular lower body face 18 parallel to shoulder 17. Surface 16 may be essentially continuous circumferentially or it may consist of several circumferentially spaced vertical sections lying in a common envelope of revolution around the interior of housing 11.

In practice surface 16 is slightly conical with its smaller end at shoulder 17, and outlet 15 intersects surface 16 at opening 19. The section of surface 16 around opening 19 provides a sealing surface completely surrounding opening 19 at that point.

A measuring chamber 21 of generally conventional form has a peripheral surface 20 and several circumferentially spaced surfaces, one of which is shown at 20a, all of which surfaces are formed slightly conical at the same angle as conical surface 16 to snugly fit surface 16. Surface 20 completely surrounds the outlet opening in the measuring chamber 21 so that when the measuring chamber is in place, surface 20 and surface 16 mate to completely seal the outlet opening in the measuring chamber and meter housing from the interior of the housing. Shoulder 17 is formed so as to be suitably spaced from the top of the measuring chamber when it is in operative position to insure full seating engagement between the surfaces 20 and 20a on the measuring chamber and surface 16 on the meter housing.

A nutating disc or piston 22 within the measuring chamber comprises essentially a circular vane 23 slotted at 24 to accommodate the usual division plate (not shown) and fixed to a spherical ball 25 from which projects a post 26 at an angle to the chamber axis.

Post 26 engages a suitable dog and shaft assembly connected to a gear reduction system within a gear box 27, and the output shaft 28 thereof is coupled to the lower end of a register drive shaft 29 journalled in upper body wall 12. Shaft 29 drives a suitable register and indicating mechanism in register box 31.

The nutating disc arrangements within the measuring chamber and the register connected drive may be essentially those of Weymouth 1,845,536 or Krueger 2,083,070 for example, to which reference is made for more detail. Water entering inlet 14 is admitted into the measuring chamber by a suitable port (not shown) where it actuates the nutating disc 23 to drive the register before escaping to outlet 15, in the usual manner.

The open bottom of body 11 is closed by a cover plate 32 which is formed with concentric flat annular parallel surfaces 33 and 34 joined by a cylindrical surface 35. At the lower end of the meter body opening 13 is surrounded by annular flat face 18. An outer flat annular body face 36 is concentric to face 18 and parallel to it and joined by a cylindrical surface 37.

When cover 32 is placed on body 11, face 34 seats flatly on body face 36, face 33 seats flatly on body face 18, and surface 35 fits snugly on surface 37. A series of suitable bolts or studs 38 extending through cover 32 enter threaded holes in the body and rigidly attach cover 32 to body 11.

Annular face 18 in the assembly extends radially inwardly of cover face 33 to overlie an inner annular cover surface 39 that is flat, smooth and parallel to face 33. A cylindrical surface 41 extends between the inner edge of face 33 and the outer edge of face 39. An O-ring seal of rubber or the like 42 is compressed between faces 39 and 18 in the assembly.

In manufacture, surface 35 is formed with a slightly shorter axial length than the axial length of surface 37 so as to insure positive engagement between surface 18 on the bottom of the meter housing and surface 33 on the cover. Positive engagement between these two surfaces is necessary to prevent the occurrence of any opening between these two surfaces into which the O-ring 42 might be forced under the influence of high pressure.

Cover 32 has an internal conical surface 30 sloping inwardly toward the center of cover 32 where surface 30 merges with a centrally located boss 50. Extending through the cover 32 at boss 50 is a threaded bore 43 in which is mounted a drain plug 44 having a seal at 45. Surrounding the inner end of bore 43 is a cup-shaped curved concave depression 46 in which is seated one end of a compression spring 47, and the upper end of spring 47 bears against a flat face 48 on the bottom of the measuring chamber 21. Thus, when cover 32 is drawn tight by bolts 38, spring 47 is compressed and urges the measuring chamber tightly against surface 16.

In the assembly, spring 47 is of such size as not to be solid when compressed to operative condition, and seating of the spring in depression 46 keeps it operatively located.

It is an extremely important feature of the invention that cover surface 35 closely surrounds body surface 37 in the assembly. These surfaces are carefully machined smooth cylindrical surfaces of revolution of substantially the same diameter, cover surface 35 however being just enough larger in diameter to slip over surface 37 when the cover is bolted into place.

This feature is particularly valuable in meters of this type where the line fluid pressures are quite high, the meter usually being subject to 2000 p.s.i. operating pressures and 4000 p.s.i. test pressures. When high pressures are exerted inside of the housing 11, the housing tends to expand outwardly in all directions and this tendency for outward expansion is particularly pronounced in the region of the bottom opening 13. Unless restrained, this tendency to expand outwardly will distort the conical seating surface 16, thereby reducing the effectiveness of or destroying the sealing engagement between surface 16 and surfaces 20 and 20a. Because of the interengagement of surfaces 35 and 37, the tendency of the housing 11 to distort under the influence of high pressure is resisted by the cover 32. Also, as the pressure within the meter housing 11 increases, because of conical surface 30, the cover tends to bow outwardly which causes the surface 37 to exert a pinching effect on surface 35 to further augment the forces resisting outward expansion of housing 11. As a result, the fluid tight seating of the measuring chamber 21 within the body is maintained and there is no leakage of inlet water around the outside of the measuring chamber to the outlet opening 15. It should also be noted that as the housing 11 tends to expand and the cover 32 tends to bow outwardly under the influence of pressure, the sealing engagement between surfaces 35 and 37 is enhanced to further augment the effect of seal 42.

Preferably, all of surfaces 34, 36, 33, 18 and 39 are concentric, flat, smooth and parallel in the assembly, being accurately machined for the best obtainable fits.

The invention therefore provides a water or like meter that is of special construction to handle high line pressure liquids without undesired internal leakage. All of the internal parts including the measuring chamber and gear box may be easily removed for repair or replacement by removing bolts 38 and cover 32.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a liquid meter, a meter body having an open bottom and side inlet and outlet passages, means defining a surface in said body that lies in a conical envelope about a generally upright axis with the larger end of said conical envelope being adjacent said bottom opening, a measuring chamber disposed in said body in seating engagement only on said surface and snugly surrounded by said surface in fluid tight relation at the intersection of said surface and one of said passages when said measuring chamber is in its normal operative position, a cover removably secured upon said body across said bottom opening, spring means compressed between said cover and said measuring chamber, said spring means being the only effective member in force transmitting relationship between the bottom of said measuring chamber and said cover and continually tightly maintaining said measuring chamber in seating engagement only on said surface irrespective of outward distortion of said body under the influence of normal internal operating pressures with the end of said measuring chamber facing toward the smaller end of said envelope being free of axial abutment with said body during normal operation, axially spaced annular surfaces on the body and cover radially outwardly of said open bottom in surrounding relation thereto, and a seal ring compressed between said axially spaced surfaces.

2. In a liquid meter, a meter body having an open bottom and side inlet and outlet passages, means defining a surface in said body that lies in a conical envelope about a generally upright axis with the larger end of said conical envelope being adjacent said bottom opening, a measuring chamber disposed in said body in seating engagement only on said surface and snugly surrounded by said surface in fluid tight relation at the intersection of said surface and one of said passages when said measuring chamber is in its normal operative position, a cover removably secured upon said body across said bottom opening, spring means compressed between said cover and said measuring chamber, said spring means being the only effective member in force transmitting relationship between the bottom of said measuring chamber and said cover and continually tightly maintaining said measuring chamber in seating engagement only on said surface irrespective of outward distortion of said body under the influence of normal internal operating pressures with the end of said measuring chamber facing toward the smaller end of said envelope being free of axial abutment with said body during normal operation, said body having a cylindrical rim surface surrounding said open bottom and said cover having a cylindrical surface closely surrounding said rim surface for resisting outward distortion of said body in the region of said bottom opening, axially spaced annular surfaces on said body and cover disposed radially inwardly of the cylindrical surfaces on said body and said cover in surrounding relationship to said open bottom, and a seal ring compressed between said axially spaced annular surfaces.

3. The liquid meter defined in claim 2 comprising tightly abuttingly engaged flat annular surfaces formed on said cover and body, said engaged flat annular surfaces being disposed radially inwardly of said rim surface and radially outwardly of said axially spaced flat annular surfaces.

4. In a liquid meter, a meter body having an open bottom and side inlet and outlet passages, means defining a surface in said body that lies in a conical envelope about a generally upright axis with the larger end of said conical envelope being adjacent said bottom opening, a measuring chamber seated in said body and snugly surrounded by said surface in fluid tight relation at the intersection of said surface and one of said passages, a cover removably secured upon said body across said bottom opening, spring means compressed between said cover and said measuring chamber with said spring means being an effective member in force transmitting relationship between the bottom of said measuring chamber and said cover for urging said measuring chamber to seat on said surface, said body having a cylindrical rim surface surrounding said open bottom and said cover having a cylindrical surface closely surrounding said rim surface for resisting outward distortion of said body in the region of said bottom opening, tightly abuttingly engaged flat annular surfaces formed on said cover and body and disposed radially inwardly of said rim surface, axially spaced annular surfaces on said body and cover radially inwardly of said engaged flat surfaces, and a seal ring compressed between said axially spaced flat annular surfaces, said cover having a generally conically shaped inner surface disposed radially inwardly of said axially spaced flat annular surfaces and enabling said cover to bow outwardly under the influence of internal operating pressures to force said cylindrical surface on said cover into pinching engagement with said rim surface on said body for augmenting the resistance to outward distortion of said body.

References Cited in the file of this patent

UNITED STATES PATENTS

| | | |
|---|---|---|
| 2,434,135 | Wetchger | Jan. 3, 1948 |
| 2,972,886 | Hanks | Feb. 28, 1961 |

FOREIGN PATENTS

| | | |
|---|---|---|
| 957 | France | Jan. 10, 1903 |
| | (Addition to 313,575) | |
| 413,778 | France | Jan. 3, 1910 |
| 25,574 | Great Britain | 1911 |